(12) United States Patent
Yahav et al.

(10) Patent No.: US 8,208,129 B2
(45) Date of Patent: Jun. 26, 2012

(54) METHOD, DEVICE AND SYSTEM FOR IMAGING

(75) Inventors: Giora Yahav, Haifa (IL); David Mandelboum, Rakefet (IL); Gil Zigelman, Nahariya (IL)

(73) Assignee: Microsoft International Holdings B.V., Amsterdam (NL)

( * ) Notice: Subject to any disclaimer, the term of this patent is extended or adjusted under 35 U.S.C. 154(b) by 0 days.

(21) Appl. No.: 12/523,055

(22) PCT Filed: Dec. 4, 2007

(86) PCT No.: PCT/IL2007/001498
§ 371 (c)(1),
(2), (4) Date: Sep. 17, 2009

(87) PCT Pub. No.: WO2008/084468
PCT Pub. Date: Jul. 17, 2008

(65) Prior Publication Data
US 2010/0053592 A1     Mar. 4, 2010

Related U.S. Application Data

(60) Provisional application No. 60/884,882, filed on Jan. 14, 2007.

(51) Int. Cl.
*G01C 3/08* (2006.01)
(52) U.S. Cl. ....... 356/4.01; 356/3.01; 356/4.1; 356/5.01
(58) Field of Classification Search ................. 356/4.01, 356/5.01; 382/103, 106
See application file for complete search history.

(56) References Cited

U.S. PATENT DOCUMENTS

| 4,490,617 | A |   | 12/1984 | Loose |
| 5,200,793 | A |   | 4/1993  | Ulich et al. |
| 5,852,492 | A | * | 12/1998 | Nimblett et al. ............. 356/5.04 |
| 6,009,359 | A | * | 12/1999 | El-Hakim et al. ............. 701/28 |
| 6,042,050 | A | * | 3/2000  | Sims et al. ................... 244/3.17 |
| 6,057,909 | A |   | 5/2000  | Yahav et al. |
| 6,091,905 | A |   | 7/2000  | Yahav et al. |

(Continued)

FOREIGN PATENT DOCUMENTS
EP     1087205 A2     3/2001
(Continued)

OTHER PUBLICATIONS

International Search Report PCT/IL07/001498, dated Apr. 3, 2009.
(Continued)

*Primary Examiner* — Isam Alsomiri
*Assistant Examiner* — Luke Ratcliffe
(74) *Attorney, Agent, or Firm* — Vierra Magen Marcus & DeNiro LLP (57) ABSTRACT

There is provided a novel method, device and system for imaging. According to some embodiments of the present invention, a visible light image sensor array (e.g. Charge-Couple Device ("CCD") or Complementary Metal-Oxide-Semiconductor ("CMOS")) and a ranging sensor array may be arranged substantially facing the same direction and having a substantially overlapping field of view. According to further embodiments of the present invention, a range value derived from one or more ranging sensor elements within the ranging sensor array may be correlated with one or more imaging elements within the visible sensor array. Image processing logic may correlate the derived ranging value with the one or more imaging elements as a function of the derived range.

15 Claims, 8 Drawing Sheets

U.S. PATENT DOCUMENTS

| | | | |
|---|---|---|---|
| 6,100,517 | A | 8/2000 | Yahav et al. |
| 6,111,979 | A * | 8/2000 | Katto .......................... 382/154 |
| 6,331,911 | B1 | 12/2001 | Manassen et al. |
| 6,567,116 | B1 | 5/2003 | Aman et al. |
| 7,092,015 | B1 | 8/2006 | Sogawa |
| 7,194,112 | B2 * | 3/2007 | Chen et al. .................... 382/106 |
| 7,701,558 | B2 * | 4/2010 | Walsh et al. ................. 356/5.01 |
| 2007/0121094 | A1 * | 5/2007 | Gallagher et al. ........... 356/4.03 |
| 2009/0228159 | A1 * | 9/2009 | Flowers et al. .................... 701/3 |
| 2010/0118122 | A1 * | 5/2010 | Hartman ........................ 348/46 |

FOREIGN PATENT DOCUMENTS

| | | | |
|---|---|---|---|
| JP | 2001092968 | A | 4/2001 |
| JP | 2001133231 | A * | 5/2001 |

OTHER PUBLICATIONS

Toyama et al., "Probabilistic Tracking in a Metric Space," Eighth International Conference on Computer Vision, Vancouver, Canada, vol. 2, Jul. 2001, 8 pages.

Chinese Office Action dated Jan. 20, 2011, The State Intellectual Property Office of the People's Republic of China, Chinese Patent Application No. 200780052135.0 filed Dec. 4, 2007.

Partial English translation of Chinese Office Action dated Jan. 20, 2011, The State Intellectual Property Office of the People's Republic of China, Chinese Patent Application No. 200780052135.0 filed Dec. 4, 2007.

Chinese Office Action dated Jul. 8, 2010 in Chinese Patent Application No. 2007800521350, International Filing Date Dec. 4, 2007.

English Translation of Abstract of Japanese Publication No. 2001092968, Published Apr. 6, 2001, Applicant Fuji Heavy Ind Ltd.

International Preliminary Report on Patentability, PCT Application No. PCT/IL2007/001498.

Response to Office Action filed Nov. 2, 2010 in Chinese Patent Application No. 200780052135.0.

Chinese Office Action dated Jun. 29, 2011, Chinese Patent Application No. 200780052135.0, filed Dec. 4, 2007, 12 pages.

English Language Summary Prepared by Chinese Counsel of Chinese Office Action dated Jun. 29, 2011, Chinese Patent Application No. 200780052135.0, filed Dec. 4, 2007, 6 pages.

Response to Chinese Office Action dated Apr. 6, 2011, The State Intellectual Property Office of the People'Republic of China, Chinese Patent Application No. 200780052135.0 filed Dec. 4, 2007, 12 pages.

English Translation of Response to Chinese Office Action dated Apr. 6, 2011, The State Intellectual Property Office of the People's Republic of China, Chinese Patent Application No. 200780052135.0 filed Dec. 4, 2007, 7 pages.

Response to Chinese Office Action dated Aug. 19, 2011, Chinese Application No. 200780052135.0, filed Dec. 4, 2007, 22 pages.

Machine Translation of JP2001-133231, 22 pages.

Chinese Office Action dated Nov. 8, 2011, Chinese Patent Application No. 200780052135.0 filed Dec. 4, 2007, 8 pages.

Response to Chinese Office Action dated Dec. 31, 2011, Chinese Patent Application No. 200780052135.0 filed Dec. 4, 2007, 8 pages.

Partial English Translation of Response to Chinese Office Action dated Dec. 31, 2011, Chinese Patent Application No. 200780052135.0 filed Dec. 4, 2007, 5 pages.

* cited by examiner

METHOD, DEVICE AND SYSTEM FOR IMAGING

RELATED APPLICATIONS

The present application is a US National Phase of PCT Application No. PCT/IL2007/001498, filed on Dec. 4, 2007, which claims the benefit under 35 U.S.C. 119(e) of U.S. Provisional Application 60/884,882 filed on Jan. 14, 2007, the disclosures of which are incorporated herein by reference.

FIELD OF THE INVENTION

The present invention relates generally to methods, devices and systems for imaging. More specifically, the present invention relates to methods, devices and systems for capturing one or more images of a scene using a visible light image sensor array and a ranging sensor array adapted to output a multi-dimensional (e.g. three dimensional) data set representing the scene.

BACKGROUND

Various techniques are known for acquiring three-dimensional images of a scene, i.e., images that include depth or distance information of the scene. Exemplary methods of multi-dimensional imaging include: (1) time-of-flight (i.e. light) measurement, (2) reflected radiation phase detection, and (3) stereoscopic image triangulation. Aforementioned techniques (1) and (2) generally require that the image be illuminated/pulsed, for example by a laser beam, and depth data acquired point by point across a field of view. Technique (3) requires multiple imaging sensor arrays and a relatively great amount of computational power in order to derive depth data in real-time. It is, however, desirable in many applications to acquire depth or distance information across an entire field of view simultaneously and in substantially real-time.

Range-gated cameras are known in the art. Such cameras may include a gated detector array, working in conjunction with a pulsed or stroboscopic light source, which illuminates a scene. The array may be gated, for example, by coupling a gated intensifier thereto, or by other means well known in the art. The gate timing of the detector array is delayed relative to the light source so that only light reflected from objects within a desired range of distances from the camera is captured. The camera cannot determine the distances to various objects or different points within the range.

U.S. Pat. No. 6,057,909, which is incorporated herein by reference, describes an apparatus for generating a multi-dimensional data set representing an image including distance information for objects in a scene. The apparatus including a modulated source of radiation, having a first modulation function, which directs radiation toward a scene; a detector, which detects radiation reflected from the scene, modulated by a second modulation function, and generates, responsive to said detected modulated radiation, signals responsive to the distance to regions of the scene; a processor, which receives signals from the detector and forms an image, based on the signals, having an intensity value distribution indicative of the distance of objects from the apparatus; and a controller, which varies at least one of the first and second modulation functions, responsive to the intensity value distribution of the image formed by the processor. The apparatus described in U.S. Pat. No. 6,057,909, may acquire depth or distance information simultaneously over the entire image.

U.S. Pat. No. 6,091,905, which is incorporated herein by reference, describes an apparatus for generating an image indicating distances to objects in a scene. The invention is comprised of a radiation source and modulator, telecentric optics for receiving and collimating the radiation reflected from the scene, a detector and a processor. The detector receives the collimated, reflected radiation and sends a signal to the processor. The processor forms an image having an intensity value distribution indicative of the distance of objects form the apparatus.

U.S. Pat. No. 6,100,517, which is incorporated herein by reference, describes an apparatus for generating an image indicating distances to points on objects in a scene, comprising: a modulated source of radiation, having a first modulation function, which directs radiation toward a scene such that a portion of the modulated radiation is reflected from the points and reaches the apparatus; an array detector which detects radiation from the scene, modulated by a second modulation function, each element of the array detector being associated with a point in the scene, each element of the array detector generating a signal, responsive to a part of the reflected radiation reaching the apparatus, the magnitude of particular element's signal being dependent on the distance of a point in the scene, associated with that element's signal; and a processor which forms an image, having an intensity value distribution indicative of the distance of each of the points in the scene from the apparatus, based on the magnitude of the signal associated with the point; wherein the first and second modulation functions comprise repetitive pulsed modulation functions which are different from each other.

Recent technological advances in industries such as gaming (e.g. immersive gaming) and multimedia communication have lead to a demand for efficient and inexpensive real-time 3D imaging methods, devices and system. 3D imaging systems for many consumer applications require the ability to generate a composite image containing both a two dimensional image displayable on a two dimensional screen and a depth map indicating the distance of specific points/objects on the two dimensional image.

Prior art imaging methods, devices and systems for generating multi-dimensional data sets representing a composite or multi-dimensional (e.g. three dimensional) image of a scene have used a combination of both a ranging sensor array and a visible light sensor array arranged on a common line of sight, for example by using a technology referred to as bore-sighting. Common line of sight arrangements are required in order to have proper correlation between two dimensional image data acquired by the visible light sensor array and ranging data acquired by the ranging sensor array. Common line of sight is achieved using optical arrangements including collimators, beam splitters and other optical elements. The use of common line of sight optical arrangements is, however, both cumbersome and costly. Complexities associated with producing common line of sight optical arrangements are a burden in the production of multi-dimensional imaging devices and systems.

There is a need in the field of imaging for improved methods, devices and systems for generating multi-dimensional image data sets representing a composite (i.e. two dimensional with depth map) images of a scene.

SUMMARY OF THE INVENTION

The present invention is a method, device and system for imaging. According to some embodiments of the present invention, a visible light image sensor array (e.g. Charge-Couple Device ("CCD") or Complementary Metal-Oxide-Semiconductor ("CMOS")) and a ranging sensor array may be arranged substantially facing the same direction and having a substantially overlapping field of view. According to further embodiments of the present invention, a range value derived from one or more ranging sensor elements within the ranging sensor array may be correlated with one or more imaging elements within the visible sensor array. Image processing logic may correlate the derived ranging value with the one or more imaging elements as a function of the derived range.

According to some embodiments of the present invention, the visible light image sensor array may be slaved in alignment to the range sensor in order to correlate the derived ranging value of one or more imaging elements as a function of the derived range. According to yet further embodiments of the present invention, the visible light image sensor array may include an objective and focusing optics with optical axis and may be any type of visible light data acquisition device (i.e. RGB\BW camera) known today or to be devised in the future.

According to some embodiments of the present invention, an offset between corresponding pixels is the shift between the position of an object in one sensing array relative to its position on the other sensing array, the offset is also referred to hereinafter as relative shift (RS). According to further embodiments of the present invention, the parallel arrangement of the sensors is setting a "sensors axis" which crosses both sensing arrays. According to yet further embodiment of the present invention, the "z" distance of an object from the ranging sensor array may set a "relative offset axis". According to another embodiment of the present invention, the relative offset between corresponding pixels may be calculated based on the (1) relative offset axis of the sensed object and (2) the coordinates of the range pixel associated with the sensed object.

According to some embodiments of the present invention, the visible light image sensor array and the ranging sensor array may be arranged substantially facing the same direction and having a substantially overlapping field of view ("parallel arrangement"). According to further embodiments of the present invention, such parallel arrangement may cause an offset between corresponding pixels on each sensor array (i.e. pixels of the same object of the scene are positioned on different relative coordinates in each sensor array).

According to some embodiments of the present invention, the offset between corresponding pixels may be calculated based on:
 a. The distance between the optical centers of the sensor arrays;
 b. The focusing length, for both the range sensor and image sensor;
 c. The coordinates of the range pixel;
 d. The coordinates of the image pixel;
 e. Ranging sensor array parameters (i.e. window parameters); and
 f. Derived ranging value (for example, gray scale parameters) of the sensed object.

An exemplary detailed calculation of the offset between corresponding pixels is given herein below.

According to some embodiments of the present invention, image processing logic may include a look-up table for the relative shift of a sensed pixel. The input parameters of the look up table may be parameters of the ranging sensor array (i.e. distance, pixel coordinates). According to yet further embodiments of the present invention, such a look up table may be generated in advance so as to provide a real time calculation of the relative offset, hence enabling the image processing logic to correlate a pixel of the ranging sensor array and a pixel of the visible light sensor array ("corresponding pixels") in substantially real time ("zero time").

According to some embodiments of the present invention, the ranging sensor array and the visible light sensor array both detect light reflected from the scene, whether originated from the illumination subsystem or coming from other sources, providing that the wavelengths are within the working range of the respective module. The light entering the ranging sensor which was not originated from the modulated light source of the system may be referred to as background noise, which may distort the accuracy of the range data generated by the ranging sensor array. According to some further embodiments of the present invention, the background noise may be filtered from the generated image based on a portion of the system's parameters.

According to some embodiments of the present invention, the ranging sensor array may produce both an intensity image and a distance image of the scene, which images are mutually registered. According to yet further embodiments of the present invention, the ranging sensor array may comprise a radiation source for illuminating a scene of interest and a detector array, preferably a CCD array, for detecting the intensity of radiation reflected from objects in the scene, as described in U.S. Pat. No. 6,057,909 entitled "Optical Ranging Camera," filed by the same applicants as the present application, which is assigned to the assignee of the present application and whose disclosure is incorporated herein by reference. The radiation source is modulated, for example by a mechanical or liquid crystal shutter, which alternately blocks and unblocks the source for predetermined, known periods of time. The reflected radiation is similarly modulated, so that radiation reaching the detector array is preferably blocked and unblocked for predetermined, known periods of time, which may be the same as or, more preferably, different from the periods of time for which the radiation source is blocked and unblocked. The intensity of the radiation reaching the detector array and detected thereby is then processed in order to determine distances from the camera of objects in the scene. The radiation source preferably comprises a laser, but may alternatively comprise suitable light sources of other types.

According to some embodiments of the present invention, the radiation source may be modulated by a first waveform and the reflected radiation in modulated by a second waveform. The shapes of the first and second waveforms and a time delay between the waveforms are adjusted to give a desired functional dependence of the intensity detected at each pixel of the detector array on the distance from the imaging system to the object imaged by the pixel. The first and second waveforms and the delay there between may be adjusted so as to define a distance "window," i.e., a range of distances of objects from the imaging system over which the distances of the objects may be determined. While the radiation source and the reflected radiation are respectively modulated by the first and second waveforms, the imaging system analyzes images only of objects inside the window. By suitably adjusting the window, the processing of the detected radiation to determine the distances from the camera to the objects within the window is simplified and/or its accuracy is improved. According to yet further embodiments of the present invention, the window is also adjusted to maximize the dynamic range of the imaging system for objects at a range of distances from the camera corresponding to a portion of the scene that is of interest.

According to some embodiments of the present invention, the first and second waveforms may be such that the source and/or reflected radiation are blocked and unblocked many times during a single field or frame of the detector array. Preferably, the first and second waveforms comprise a plurality of pulses, wherein each pulse of the second waveform follows a corresponding pulse of the first waveform by a predetermined, typically constant, delay. Considering that the duration of a standard NTSC video field is about 16.7 msec, while the durations of the pulses of the first and second waveforms are typically less than one microsecond, it will be appreciated that hundreds or thousands of such pulses may be included in the time of a single field or frame. Such multiple-pulse modulation functions are useful in increasing the signal/noise ratio ("SNR") of the image produced by the imaging system.

According to some embodiments of the present invention, the window may be adjusted adaptively so as to acquire images of one or more objects of interest. Preferably, a first window, encompassing a large range of distances from the imaging system, is initially defined by modulating the source and the reflected radiation using waveforms of relatively long duration. An image of the objects of interest is acquired within this window, and the distance to at least one of the objects is determined. A second window is then defined, including the at least one object and preferably encompassing a narrower range of distances than the first window. In this way, a second image is acquired including reduced clutter of objects that are not of interest, and allowing more accurate determination of the distance to the at least one object of interest.

According to some embodiments of the present invention, the detector array may be a two-dimensional matrix array, for example a CCD array, and one or more light modulators modulate the reflected light reaching the array so that different modulation waveforms are respectively associated with different rows or groups of adjacent rows of the array. In this manner, different distance windows, i.e., different selected ranges of distances, are associated with different rows or groups of adjacent rows. Each such row or group of adjacent rows will produce a line image of the scene containing depth information regarding objects intersected by the line. Methods for the creation of an image of an entire scene are described in details in U.S. Pat. No. 6,057,909 incorporated here by reference.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a method, device and system for imaging. According to some embodiments of the present invention, a visible light image sensor array (e.g. Charge-Couple Device ("CCD") or Complementary Metal-Oxide-Semiconductor ("CMOS")) and a ranging sensor array may be arranged substantially facing the same direction and having a substantially overlapping field of view. According to further embodiments of the present invention, a range value derived from one or more ranging sensor elements within the ranging sensor array may be correlated with one or more imaging elements within the visible sensor array. Image processing logic may correlate the derived ranging value with the one or more imaging elements as a function of the derived range.

According to some embodiments of the present invention, the visible light image sensor array may be slaved in alignment to the range sensor in order to correlate the derived ranging value of one or more imaging elements as a function of the derived range. According to yet further embodiments of the present invention, the visible light image sensor array may include an objective and focusing optics with optical axis and may be any type of visible light data acquisition device (i.e. RGB\BW camera) known today or to be devised in the future.

According to some embodiments of the present invention, an offset between corresponding pixels is the shift between the position of an object in one sensing array relative to its position on the other sensing array, the offset is also referred to hereinafter as relative shift (RS). According to further embodiments of the present invention, the parallel arrangement of the sensors is setting a "sensors axis" which crosses both sensing arrays. According to yet further embodiment of the present invention, the "z" distance of an object from the ranging sensor array may set a "relative offset axis". According to another embodiment of the present invention, the relative offset between corresponding pixels may be calculated based on the (1) relative offset axis of the sensed object and (2) the coordinates of the range pixel associated with the sensed object.

According to some embodiments of the present invention, the visible light image sensor array and the ranging sensor array may be arranged substantially facing the same direction and having a substantially overlapping field of view ("parallel arrangement"). According to further embodiments of the present invention, such parallel arrangement may cause an offset between corresponding pixels on each sensor array (i.e. pixels of the same object of the scene are positioned on different relative coordinates in each sensor array).

According to some embodiments of the present invention, the offset between corresponding pixels may be calculated based on:

g. The distance between the optical centers of the sensor arrays;
h. The focusing length, for both the range sensor and image sensor;
i. The coordinates of the range pixel;
j. The coordinates of the image pixel;
k. Ranging sensor array parameters (i.e. window parameters); and
l. Derived ranging value (for example, gray scale parameters) of the sensed object.

An exemplary detailed calculation of the offset between corresponding pixels is given herein below.

According to some embodiments of the present invention, image processing logic may include a look-up table for the relative shift of a sensed pixel. The input parameters of the look up table may be parameters of the ranging sensor array (i.e. distance, pixel coordinates). According to yet further embodiments of the present invention, such a look up table may be generated in advance so as to provide a real time calculation of the relative offset, hence enabling the image processing logic to correlate a pixel of the ranging sensor array and a pixel of the visible light sensor array ("corresponding pixels") in substantially real time ("zero time").

According to some embodiments of the present invention, the ranging sensor array and the visible light sensor array both detect light reflected from the scene, whether originated from the illumination subsystem or coming from other sources, providing that the wavelengths are within the working range of the respective module. The light entering the ranging sensor which was not originated from the modulated light source of the system may be referred to as background noise, which may distort the accuracy of the range data generated by the ranging sensor array. According to some further embodiments of the present invention, the background noise may be filtered from the generated image based on a portion of the system's parameters.

According to some embodiments of the present invention, the ranging sensor array may produce both an intensity image and a distance image of the scene, which images are mutually registered. According to yet further embodiments of the present invention, the ranging sensor array may comprise a radiation source for illuminating a scene of interest and a detector array, CCD or CMOS imaging array, for detecting the intensity of radiation reflected from objects in the scene, as described in U.S. Pat. No. 6,057,909 entitled "Optical Ranging Camera," filed by the same applicants as the present application, which is assigned to the assignee of the present application and whose disclosure is incorporated herein by reference. The radiation source is modulated, for example by a mechanical, liquid crystal shutter or a GaAs Shutter which is described in U.S. Pat. No. 6,331,911 entitled "Large Aperture Optical Image Shutter" filed by the same applicants as the present application, which is assigned to the assignee of the present application and whose disclosure is incorporated herein by reference, which alternately blocks and unblocks the source for predetermined, known periods of time. The reflected radiation is similarly modulated, so that radiation reaching the detector array is preferably blocked and unblocked for predetermined, known periods of time, which may be the same as or, more preferably, different from the periods of time for which the radiation source is blocked and unblocked. The intensity of the radiation reaching the detector array and detected thereby is then processed in order to determine distances from the camera of objects in the scene. The radiation source preferably comprises a laser, but may alternatively comprise suitable light sources of other types.

According to some embodiments of the present invention, the radiation source may be modulated by a first waveform and the reflected radiation in modulated by a second waveform. The shapes of the first and second waveforms and a time delay between the waveforms are adjusted to give a desired functional dependence of the intensity detected at each pixel of the detector array on the distance from the imaging system to the object imaged by the pixel. The first and second waveforms and the delay there between may be adjusted so as to define a distance "window," i.e., a range of distances of objects from the imaging system over which the distances of the objects may be determined. While the radiation source and the reflected radiation are respectively modulated by the first and second waveforms, the imaging system analyzes images only of objects inside the window. By suitably adjusting the window, the processing of the detected radiation to determine the distances from the camera to the objects within the window is simplified and/or its accuracy is improved. According to yet further embodiments of the present invention, the window is also adjusted to maximize the dynamic range of the imaging system for objects at a range of distances from the camera corresponding to a portion of the scene that is of interest.

According to some embodiments of the present invention, the first and second waveforms may be such that the source and/or reflected radiation are blocked and unblocked many times during a single field or frame of the detector array. Preferably, the first and second waveforms comprise a plurality of pulses, wherein each pulse of the second waveform follows a corresponding pulse of the first waveform by a predetermined, typically constant, delay. Considering that the duration of a standard NTSC video field is about 16.7 msec, while the durations of the pulses of the first and second waveforms are typically less than one microsecond, it will be appreciated that hundreds or thousands of such pulses may be included in the time of a single field or frame. Such multiple-pulse modulation functions are useful in increasing the signal/noise ratio ("SNR") of the image produced by the imaging system.

According to some embodiments of the present invention, the window may be adjusted adaptively so as to acquire images of one or more objects of interest. Preferably, a first window, encompassing a large range of distances from the imaging system, is initially defined by modulating the source and the reflected radiation using waveforms of relatively long duration. An image of the objects of interest is acquired within this window, and the distance to at least one of the objects is determined. A second window is then defined, including the at least one object and preferably encompassing a narrower range of distances than the first window. In this way, a second image is acquired including reduced clutter of objects that are not of interest, and allowing more accurate determination of the distance to the at least one object of interest.

According to some embodiments of the present invention, the detector array may be a two-dimensional matrix array, for example a CMOS Imaging array, and one or more light modulators modulate the reflected light reaching the array so that different modulation waveforms are respectively associated with different rows or groups of adjacent rows of the array. In this manner, different distance windows, i.e., different selected ranges of distances, are associated with different rows or groups of adjacent rows. Each such row or group of adjacent rows will produce a line image of the scene containing depth information regarding objects intersected by the line. Methods for the creation of an image of an entire scene are described in details in U.S. Pat. No. 6,057,909 incorporated here by reference.

Figure 1A:
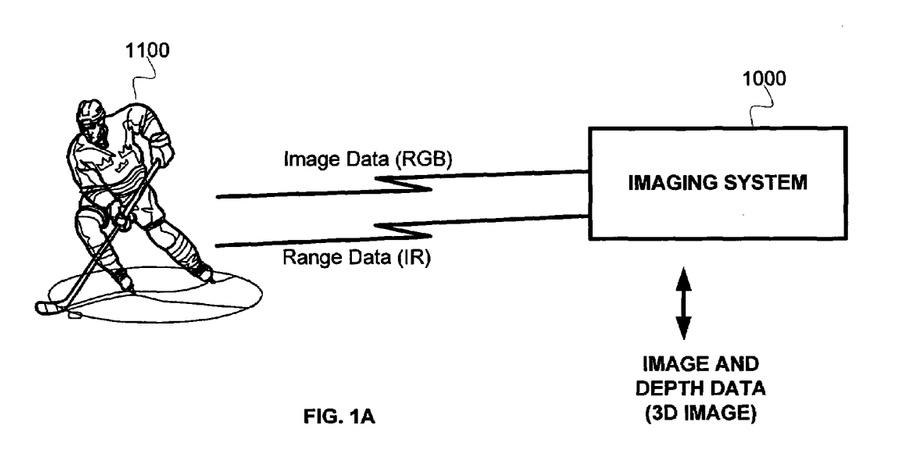
FIG. 1A shows an exemplary use of a multi-dimensional imaging system according to some embodiments of the present invention.

Turning now to FIG. 1A, there is shown an exemplary use of a multi-dimensional imaging system (1000) according to some embodiments of the present invention. According to some embodiments of the present invention, imaging system 1000 may be adapted to acquire image data and range data from a scene (1100) and by correlating elements of the image data and range data to produce an image and depth data (i.e. a 3 dimensional image) of the scene.

Figure 1B:
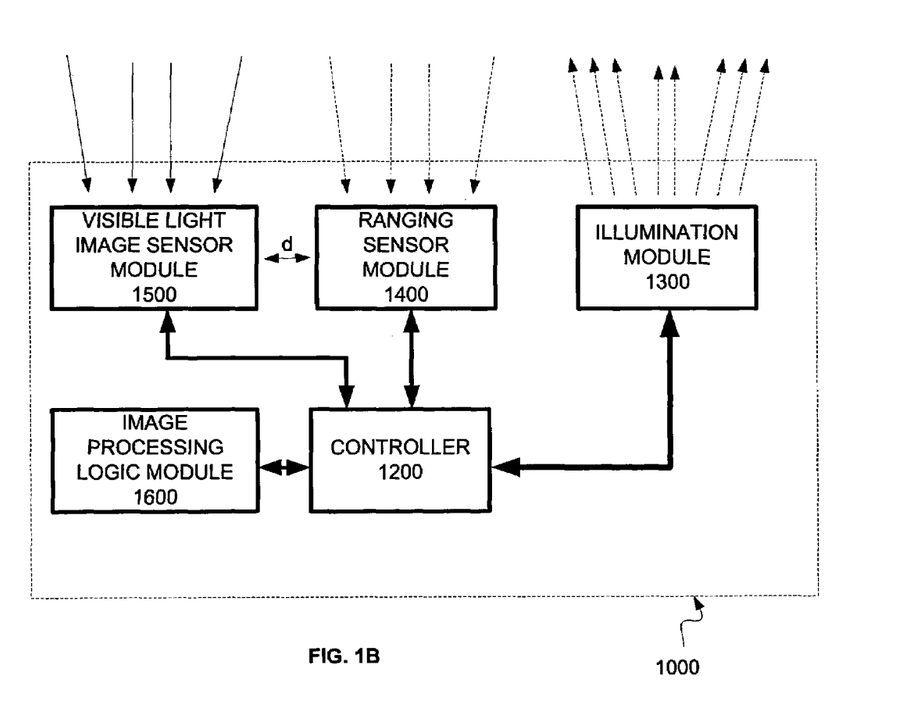
FIG. 1B shows a functional block diagram of a multi-dimensional imaging system according to some embodiments of the present invention.

Turning now to FIG. 1B, there is shown a functional block diagram of a multi-dimensional imaging system 1000 according to some embodiments of the present invention. According to some embodiments of the present invention, imaging system 1000 may include: (1) a controller 1200, (2) an illumination module 1300, (3) a ranging sensor module 1400, (4) a visible light image sensor module 1500, and (6) an image processing logic module 1600. According to some embodiments of the present invention, the ranging sensor module may include a ranging sensor array and the visible light image sensor module may include a visible light image sensor array. According to some embodiments of the present invention, the ranging sensor module 1400 and the visible light sensor module 1500 may both detect light reflected from the scene, whether originated from the illumination module 1300 or coming from other sources. According to some embodiments of the present invention, the visible light image sensor module (1500) and the ranging sensor module (1400) may be arranged substantially facing the same direction and having a substantially overlapping field of view. According to further embodiments of the present invention, a range value derived from one or more ranging sensor elements within the ranging sensor array may be correlated with one or more imaging elements within the visible sensor array as described herein below.

According to further embodiments of the present invention, the image processing logic module 1600 may correlate the derived ranging value with the one or more imaging elements as a function of the derived range.

Figure 2A:
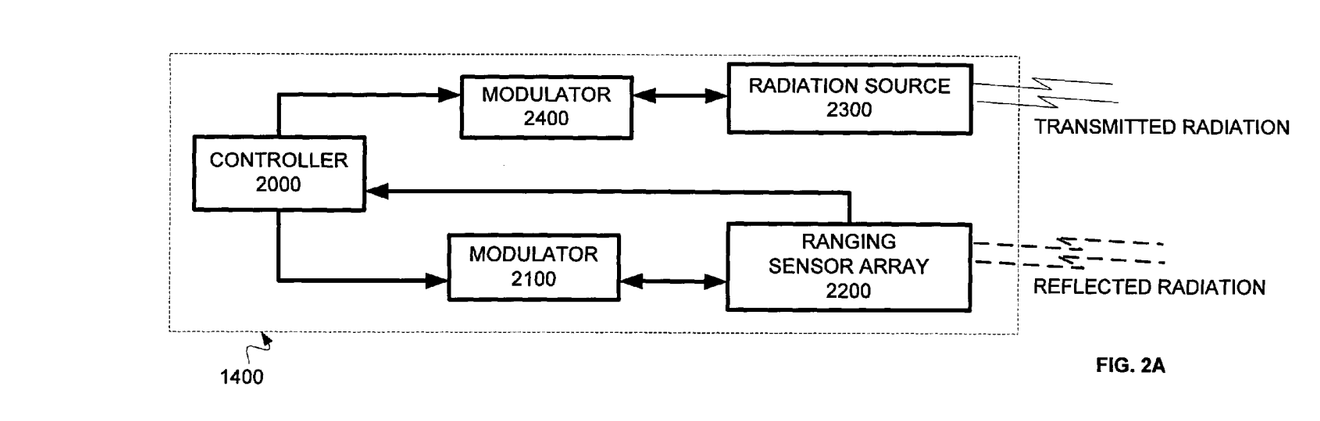
FIG. 2A shows a functional block diagram of a ranging segment of an imaging system according to some embodiments of the present invention.

Turning now to FIG. 2A, there is shown a functional block diagram of a ranging segment of an imaging system according to some embodiments of the present invention. According to some embodiments of the present invention, ranging sensor module 1400 may include: (1) a controller 2000, (2) a first modulator 2100, (3) a ranging sensor array 2200, (4) a radiation source 2300, and (5) a second modulator 2400. According to some embodiments of the present invention, controller 2000 may produce both an intensity image and a distance image of the scene, which images are mutually registered. According to yet further embodiments of the present invention, the ranging sensor module 1400 may comprise a radiation source 2300 for illuminating a scene of interest and a ranging sensor array 2200, for detecting the intensity of radiation reflected from objects in the scene, as described in U.S. Pat. No. 6,057,909 entitled "Optical Ranging Camera," filed by the same applicants as the present application, which is assigned to the assignee of the present application and whose disclosure is incorporated herein by reference. The radiation source may be modulated by modulator 2400, for example by a mechanical, liquid crystal shutter or a GaAs Shutter which is described in U.S. Pat. No. 6,331,911 entitled "Large Aperture Optical Image Shutter" filed by the same applicants as the present application, which is assigned to the assignee of the present application and whose disclosure is incorporated herein by reference, which alternately blocks and unblocks the source for predetermined, known periods of time. The reflected radiation is similarly modulated by modulator 2100, so that radiation reaching the sensor array 2200 is preferably blocked and unblocked for predetermined, known periods of time, which may be the same as or, more preferably, different from the periods of time for which the radiation source 2300 is blocked and unblocked. The intensity of the radiation reaching the detector array and detected thereby is then processed in order to determine distances from the camera of objects in the scene. The radiation source 2300 preferably comprises a laser, but may alternatively comprise suitable light sources of other types. The functional operation of ranging sensor module 1400 may best be described in conjunction with FIG. 2B, there is shown an exemplary operation of an imaging system 1000 including a ranging sensor module 1400 in accordance with some embodiments of the present invention.

Figure 2B:
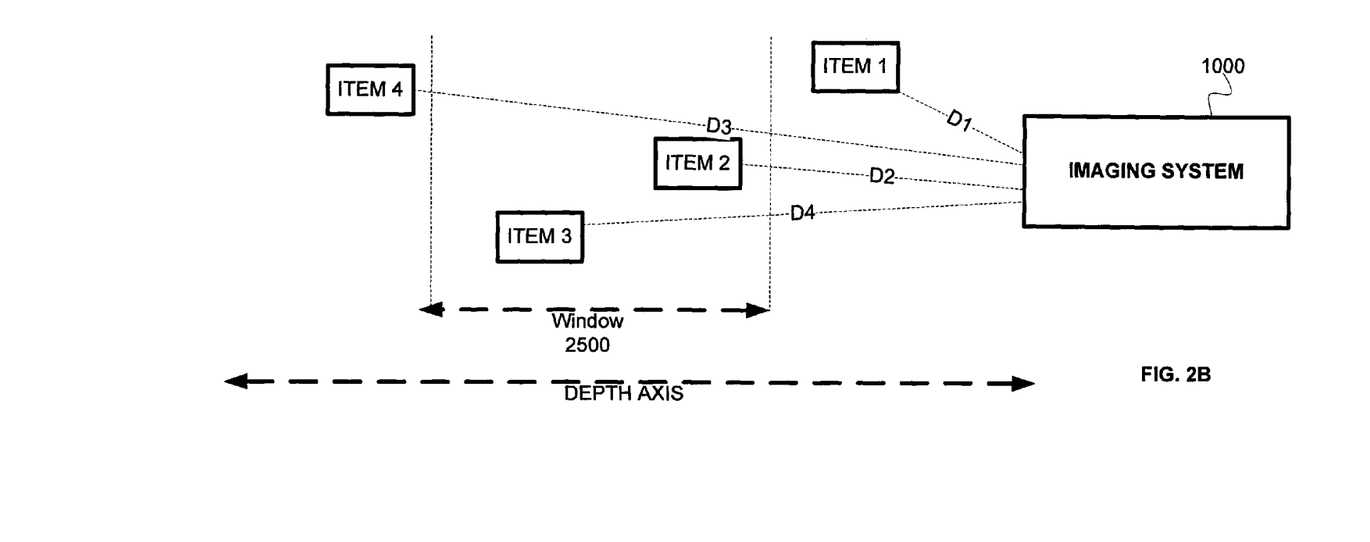
FIG. 2B shows exemplary operation of an imaging system including a ranging segment according to some embodiments of the present invention.

According to some embodiments of the present invention, radiation source 2300 may be modulated by a first waveform and the reflected radiation in modulated by a second waveform. The shapes of the first and second waveforms and a time delay between the waveforms are adjusted to give a desired functional dependence of the intensity detected at each pixel of the ranging sensor array 2200 on the distance from the imaging system to the object imaged by the pixel. The first and second waveforms and the delay there between may be adjusted so as to define a distance "window" (2500), i.e., a range of distances of objects from the imaging system over which the distances of the objects may be determined. While the radiation source and the reflected radiation are respectively modulated by the first and second waveforms, the imaging system analyzes images only of objects inside the window, the example shown in FIG. 2B is of an imaging system 1000 which detects radiation reflected of four different items/objects having different distances from the imaging system (i.e. ITEM 1 has a D1 distance from the imaging system and so forth). In the example, only ITEM 2 and ITEM 3 are located within distance window 2500, accordingly, imaging system 1000 analyzes only ITEM 2 and ITEM 3 and ignores ITEM 1 and ITEM 4. According to yet further embodiments of the present invention, the window 2500 may also be adjusted to maximize the dynamic range of the imaging system for objects at a range of distances from the camera corresponding to a portion of the scene that is of interest.

According to some embodiments of the present invention, the first and second waveforms (created by modulators 2300 and 2400) may be such that the source and/or reflected radiation are blocked and unblocked many times during a single field or frame of the sensor array 2200. Preferably, the first and second waveforms may comprise a plurality of pulses, wherein each pulse of the second waveform follows a corresponding pulse of the first waveform by a predetermined, typically constant, delay.

According to some embodiments of the present invention, distance window 2500 may be adjusted adaptively so as to acquire images of one or more objects of interest. Preferably, a first window, encompassing a large range of distances from the imaging system, is initially defined by modulating the source and the reflected radiation using waveforms of relatively long duration. An image of the objects of interest is acquired within this window, and the distance to at least one of the objects is determined. A second window is then defined, including the at least one object and preferably encompassing a narrower range of distances than the first window. In this way, a second image is acquired including reduced clutter of objects that are not of interest, and allowing more accurate determination of the distance to the at least one object of interest.

Figure 3:
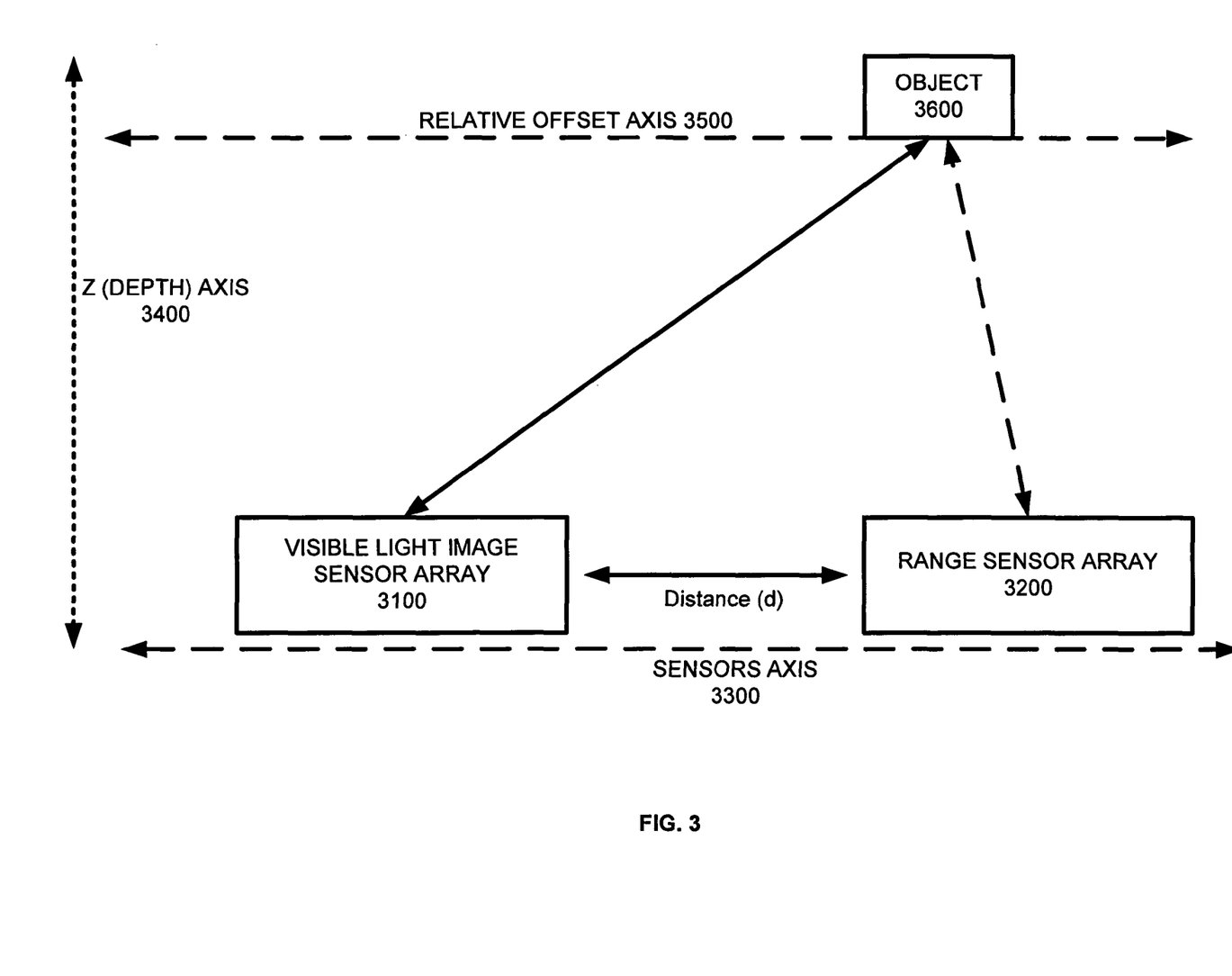
FIG. 3 is a block diagram showing exemplary relationships/arrangements between segments of an imaging system according to some embodiments of the present invention and an object being imaged.

Turning now to FIG. 3, there is shown a block diagram of exemplary relationships/arrangements between segments of an imaging system according to some embodiments of the present invention and an object being imaged. According to some embodiments of the present invention, a visible light image sensor array 3100 may be slaved in alignment with a range sensor array 3200 in order to correlate a ranging element(s) with one or more imaging elements as a function of the derived range. According to yet further embodiments of the present invention, the visible light image sensor array 3100 may include an objective and focusing optics with optical axis and may be any type of visible light data acquisition device known today or to be devised in the future.

According to some embodiments of the present invention, an offset between corresponding pixels is the shift between the position of an object in one sensing array relative to its position on the other sensing array, the offset is also referred to hereinafter as relative shift (RS). According to further embodiments of the present invention, the parallel arrangement of the sensors is setting a "sensors axis" 3300 which crosses both sensing arrays. According to yet further embodiment of the present invention, the "z" distance (measured on a Depth axis 3400) of an object from the ranging sensor array may set a "relative offset axis" 3500. According to another embodiment of the present invention, the relative offset between corresponding pixels may be calculated based on the (1) relative offset axis of the sensed object and (2) the coordinates of the range pixel associated with the sensed object. A detailed calculation is described herein below.

Figure 4A:
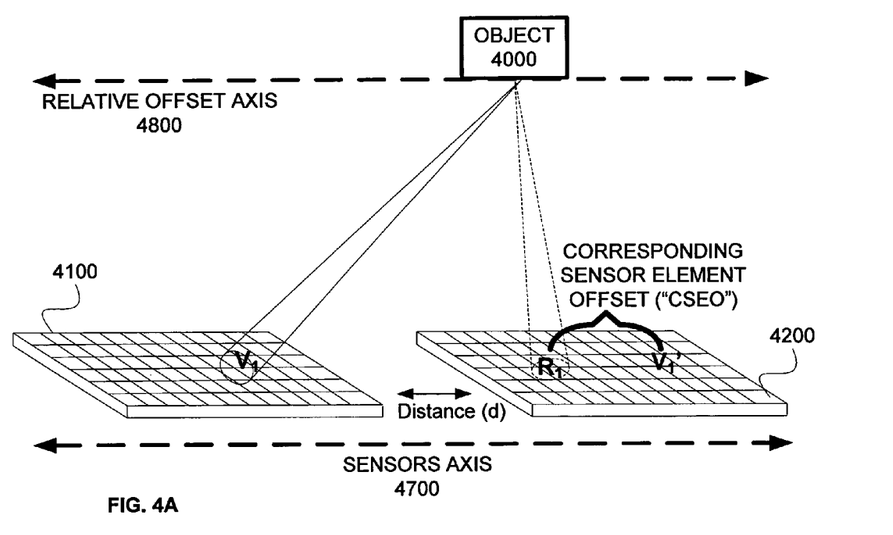
FIG. 4A is a diagram illustrating a relationship between a position of an object being imaged and the object's image on each of the sensor arrays according to some embodiments of the present invention.

Turning now to FIG. 4A, there is shown a first diagram illustrating a relationship between a position of an object being imaged and the object's image on each of the sensor arrays according to some embodiments of the present invention.

According to some embodiments of the present invention, the visible light image sensor array 4100 and the ranging sensor array 4200 may be arranged substantially facing the same direction and having a substantially overlapping field of view ("parallel arrangement"). According to further embodiments of the present invention, such parallel arrangement may cause an offset between corresponding pixels on each sensor array (i.e. pixels of the same object of the scene are positioned on different relative coordinates in each sensor array). According to further embodiments of the present invention, the parallel arrangement of the sensors is setting a "sensors axis" 4700 which crosses both sensing arrays. According to yet further embodiment of the present invention, the "z" distance of an object from the ranging sensor array may set a "relative offset axis" 4800. FIG. 4A shows an object 4000 positioned on a relative offset axis 4800. Object 4000 is detected by the ranging sensor array 4200 by one or more ranging elements in address $R_1$, image processing logic is adapted to correlate a ranging value derived from elements in position $R_1$ with one or more visible light sensor array imaging elements ($V_1$) as a function of the derived ranging value of the ranging elements in address $R_1$.

According to further embodiments of the present invention, image processing logic may also be adapted to correlate the ranging value derived from the ranging sensor elements in position $R_1$ with a visible light sensor array imaging element by applying the offset value to an address of the ranging sensor elements (i.e. the address of $R_1$), thereby determining an address ($V_1'$) of a corresponding visible light sensor array imaging element ($V_1$).

According to some embodiments of the present invention, the image processing logic may register/detect object 4000 based on a clustered set of ranging values from a set of ranging sensor elements ($R_1$). According to yet further embodiments of the present invention, the image processing logic may correlate the set of ranging sensor elements ($R_1$) with a set of visible light sensor array imaging elements ($V_1$) by estimating an offset value for the set of ranging sensor elements, which estimation is based on the derived range of the ranging elements. According to yet some further embodiments of the present invention, the image processing logic may apply the offset value to an address of the set of ranging sensor elements ($R_1$) to determine an address ($V_1'$) of a corresponding set of visible light sensor array imaging elements ($V_1$), the offset between corresponding elements is referred to as Corresponding Sensor Element Offset ("CSEO").

Figure 4B:
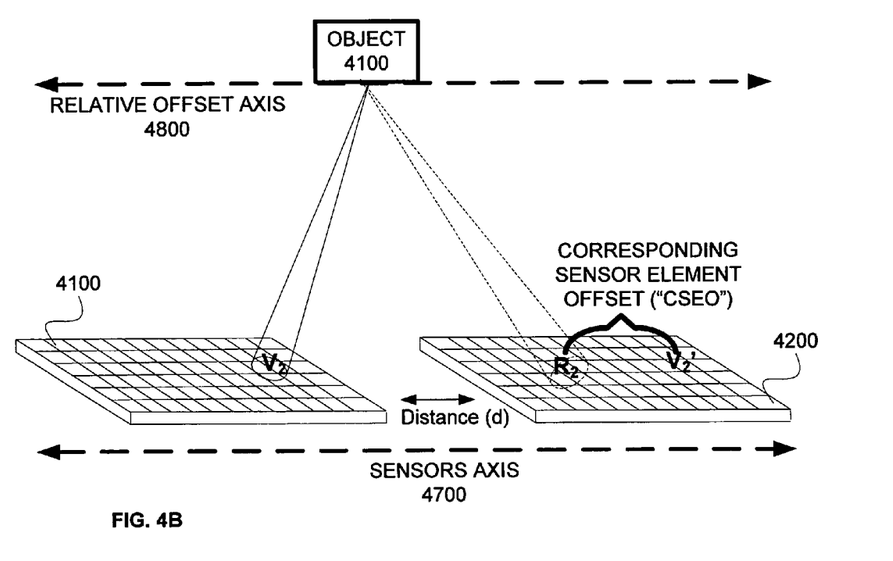
FIG. 4B is a second diagram illustrating the relationship illustrated in FIG. 4A, when the object is moved along a relative offset axis.

FIG. 4B shows yet another object (4100) which is positioned on the same relative offset axis 4800 as object 4000 but located differently on the offset axis. According to some embodiments of the present invention, the CSEO of ranging elements $R_2$ may be identical to the CSEO of ranging elements $R_1$.

Figure 5A:
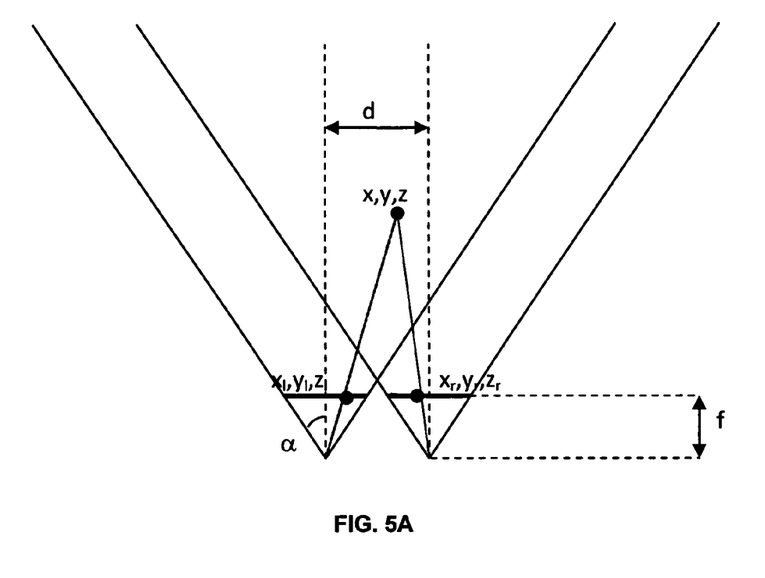
FIG. 5A shows a geometric formula 1.
Figure 5B:
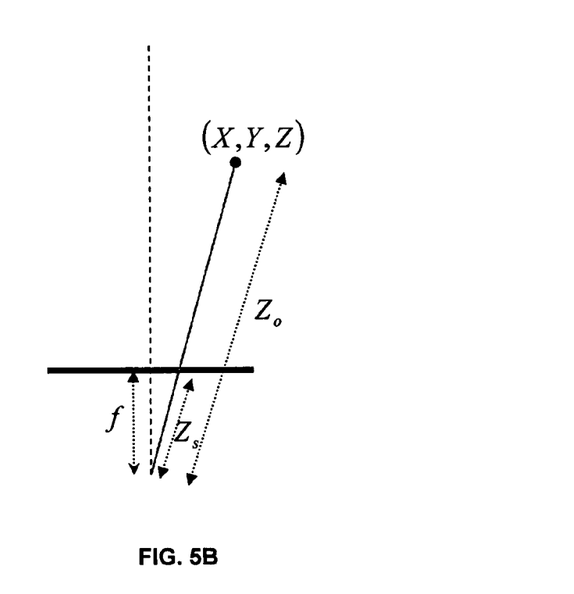
FIG. 5B shows a geometric formula 2.
Figure 6:
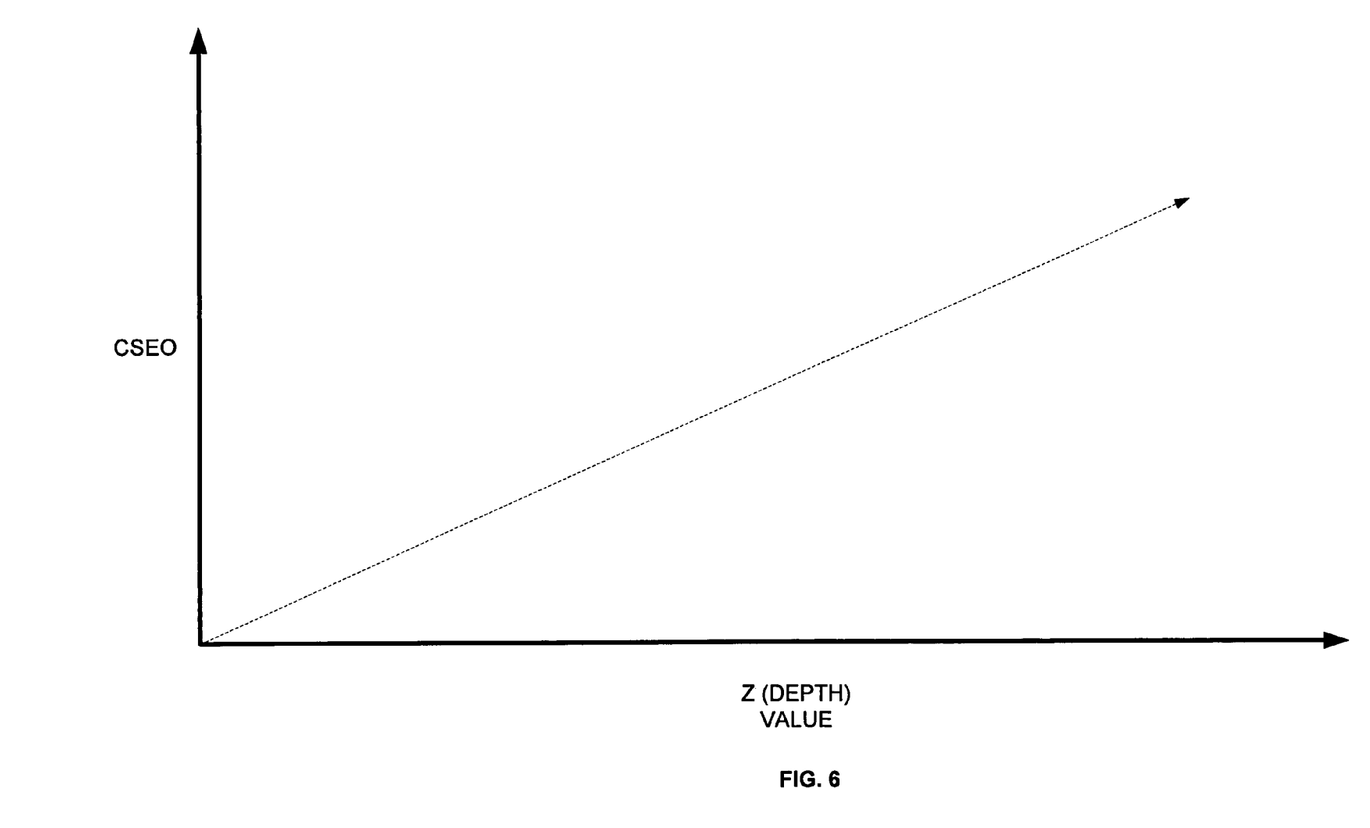
FIG. 6 is a graph showing the relationship between Corresponding Sensor Element Offset and object depth.

A more detailed example of calculation of the relative offset of an object may best be described in conjunction with FIG. 5A and FIG. 5B, there are shown schematics of a geometric formula for calculating the relative offset of an object (i.e. the offset between corresponding objects) according to some embodiments of the present invention. The offset between corresponding pixels may be calculated based on:

a. The distance between the optical centers of the sensor arrays (d);
b. The focusing length, for both the range sensor and image sensor (f);
c. The coordinates of the range pixel ($X_r, Y_r, Z_r$);
d. The coordinates of the image pixel($X_l, Y_l, Z_l$);
e. The sensed object distance from the ranging array (Z)
f. The derived ranging value (for example, gray scale parameters) of the sensed object.

According to some embodiments of the present invention, the offset calculation may be performed as follows:

$$\frac{f}{x_r} = \frac{z}{x}$$

$$x = z\frac{x_r}{f}$$

$$\frac{f}{x_l} = \frac{z}{(d-x)} = \frac{z}{\left(d - z\frac{x_r}{f}\right)}$$

$$\Rightarrow x_l = \frac{df - x_r z}{z}$$

Accordingly we can calculate the deviation between corresponding pixels (offset-marked as E) of every three dimensional element (i.e. pixel) using the following equation:

$$E = -x_r - x_l = -x_r - \frac{df - x_r z}{z} - = -\frac{df}{z}. \quad 1$$

According to some embodiments of the present invention, the resolution used by the ranging sensor module and the resolution used by the visible light sensor module may be different, furthermore, the pixel size of each module may be also different. Accordingly, the calculating the offset may involve some additional steps, the following notation is used in FIG. 5B and in the equations herein below A. S—pixel size of the ranging sensor module.
B. $P_d$—window start (primary distance)
C. $P_w$—widow width (primary width)
D. $Z_o$—distance between the camera to the object.
E. $Z_s$—distance between the focal point and the pixel position on the sensor.
F. ($x_p, y_p$)—the point in pixels on the image
G. ($x_c, y_c$)—the image center in pixels We know that:

$$Z_o = P_d + P_w(1 - g/255). \quad 2$$

$$Z_s = \sqrt{(S(y_p - y_c))^2 + f^2}. \quad 3$$

$$\frac{Z_s}{Z_o} = \frac{f}{Z}. \quad 4$$

$$Z = f\frac{Z_o}{Z_s}. \quad 5$$

By combining equation no.5 with equation no.1, we get:

$$E' = \frac{E}{S} = \frac{df}{Sz} = \frac{df}{S\left(f\frac{Z_o}{Z_s}\right)} = \frac{dZ_s}{SZ_o} = \frac{d}{S}\frac{Z_s}{Z_o}$$

According to some embodiments of the present invention, image processing logic module 1600 may include a look-up table for the relative shift of a sensed pixel. The input parameters of the look up table may be parameters of the ranging sensor array (i.e. distance, pixel coordinates). According to yet further embodiments of the present invention, such a look up table may be generated in advance so as to provide a real time calculation of the relative offset, hence enabling the image processing logic to correlate a pixel of the ranging sensor array and a pixel of the visible light sensor array ("corresponding pixels") in substantially real time ("zero time").

Figure 7:
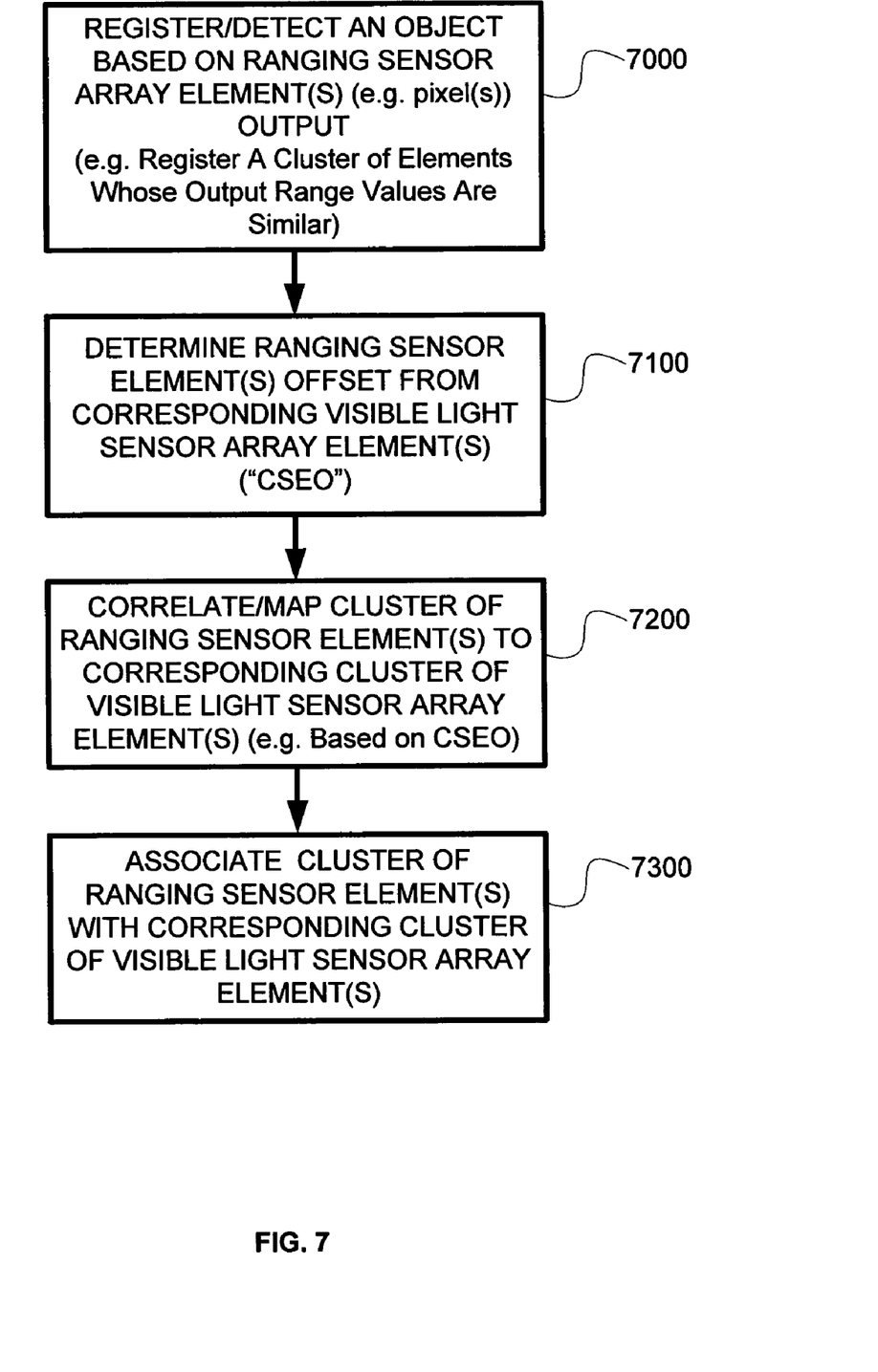
FIG. 7 is a flow chart including the steps of an exemplary method by which an imaging according to some embodiments of the present invention may correlate elements from a ranging sensor array with elements in a visible light sensors array.

Turning now to FIG. 7, there is shown a flow chart including the steps of an exemplary method by which an imaging according to some embodiments of the present invention may correlate elements from a ranging sensor array with elements in a visible light sensors array.

The method shown in FIG. 7 may best be described in conjunction with the system shown in FIG. 1B and in accordance with some embodiments of the present invention. Controller 1200 may be adapted to register/detect an object based on ranging sensor array (a segment of ranging sensor module 1400) element(s) output (e.g. register a cluster of elements whose output range values are similar) as shown in step 7000.

According to further embodiments of the present invention, controller 1200 may be adapted to determine ranging sensor element(s) offset from corresponding visible light sensor array element(s) ("CSEO") as shown in step 7100.

According to yet further embodiments of the present invention, controller 1200 may be further adapted to correlate/map cluster of ranging sensor element(s) to corresponding cluster of visible light sensor array element(s) (e.g. based on CSEO) as shown in step 7200. According to yet further embodiments of the present invention, controller 1200 may be adapted to associate a cluster of ranging sensor element(s) with corresponding cluster of visible light sensor array element(s) as shown in step 7300.

Figure 8:
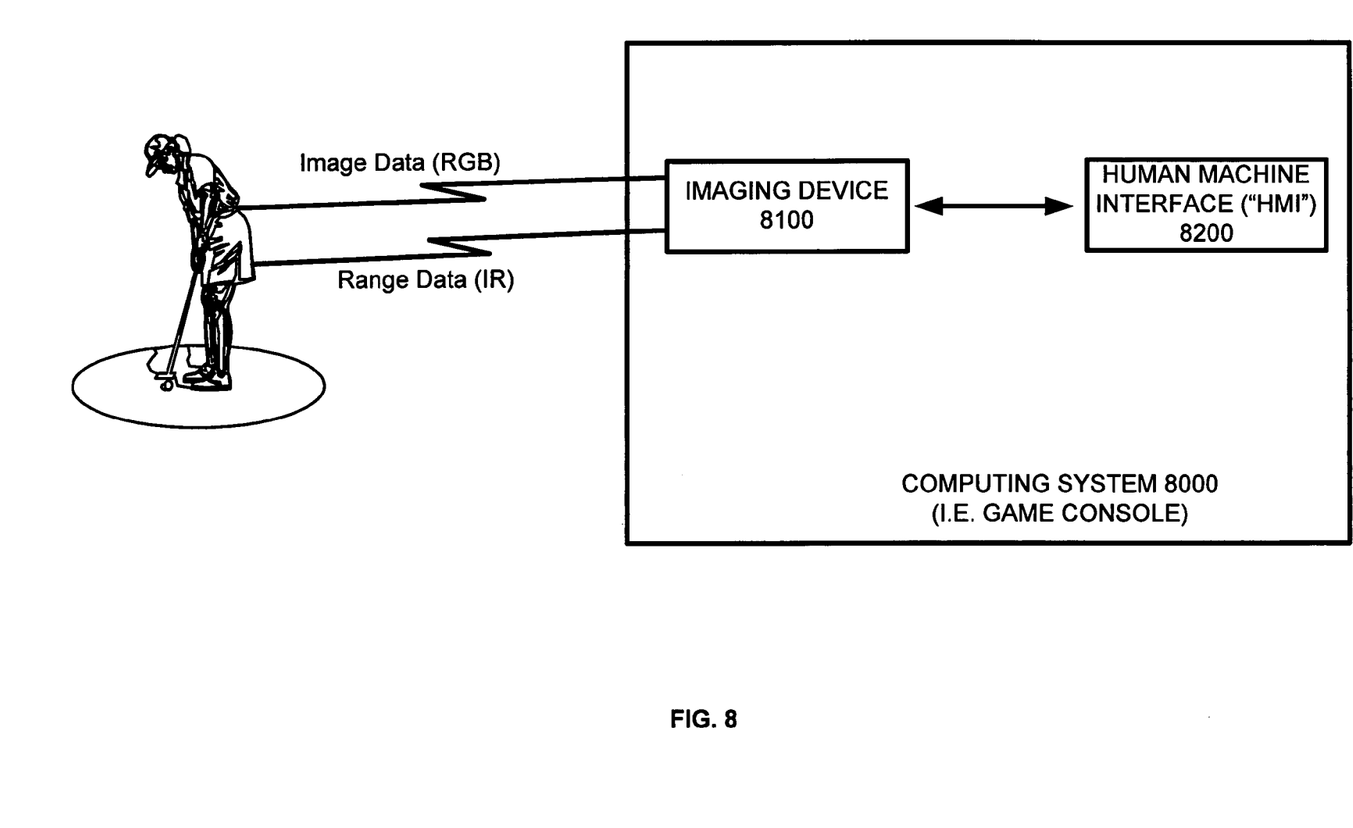
FIG. 8 is a block diagram showing an exemplary operation of a computing system (i.e. game console) including an imaging system which includes a ranging segment according to some embodiments of the present invention.

Turning now to FIG. 8, there is shown an exemplary operation of a computing system 8000 (i.e. game console) including an imaging device 8100 according to some embodiments of the present invention. According to some embodiments of the present invention, the computing system may include: (1) an imaging device 8100 functionally operated as described hereinabove and (2) a Human Machine Interface ("HMI") 8200, which HMI may be functionally coupled to the imaging device and the computing system. According to yet further embodiments of the present invention, the HMI may be adapted to convert a three Dimensional image and/or three Dimensional motion to an electronic control signal.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. An imaging device comprising:
    a visible light image sensor array of pixels and a ranging sensor array of pixels, the sensor arrays being positioned in a parallel arrangement along a sensors axis and substantially facing the same direction and having at least a partially overlapping field of view; and
    image processing logic adapted to correlating a first pixel of the ranging sensor array, the first pixel capturing data from which is derived a ranging value representing a distance to an object, with a corresponding first pixel of the visible light sensor array, the corresponding first pixel capturing image data of the same object, based on the derived ranging value and the parallel arrangement of the arrays along the sensors axis.

2. The device according to claim 1, wherein said image processing logic is adapted to correlating the first pixel of the ranging sensor array, the first pixel capturing data from which is derived the ranging value representing the distance to the object with the corresponding first pixel of the visible light sensor array, the corresponding first pixel capturing image data of the same object, based on the derived ranging value and the parallel arrangement of the arrays along the sensors axis by estimating an offset value and applying the offset value to an address of the first pixel of the ranging sensor array for determining an address of the corresponding first pixel of the visible light sensor array.

3. The device according to claim 2, wherein estimating the offset value is based on the following:
    a distance between optical centers of the sensor arrays;
    a focusing length which is the same for the sensor arrays in a Z direction extending from the sensors axis towards the object;
    coordinates in three directions including the Z direction of a focal point of the first pixel of the ranging sensor array from the optical center of the ranging sensor array;
    coordinates in three directions including the Z direction of a focal point of the first pixel of the visible light sensor array from the optical center of the visible light sensor array; and
    the derived ranging value from the first pixel of the ranging sensor array to the object.

4. The device according to claim 1, wherein said image processing logic is further adapted to filter background noise.

5. A method of imaging comprising:
    substantially concurrently acquiring a visible light image with a visible light image sensor array of pixels and a ranging image from a ranging sensor array of pixels, which visible light image sensor array and ranging sensor array are positioned in a parallel arrangement along a sensors axis and substantially face the same direction and have at least partially overlapping fields of view; and
    correlating a first pixel of the ranging sensor array, the first pixel capturing data from which is derived a ranging value representing a distance to an object, with a corresponding first pixel of the visible light sensor array, the corresponding first pixel capturing image data of the same object, based on the derived ranging value and the parallel arrangement of the arrays along the sensors axis.

6. The method according to claim 5, wherein correlating the first pixel of the ranging sensor array, the first pixel capturing data from which is derived the ranging value representing the distance to the object, with the corresponding first pixel of the visible light sensor array, the corresponding first pixel capturing image data of the same object, based on the derived ranging value and the parallel arrangement of the arrays along the sensors axis includes estimating an offset value and applying the offset value to an address of the first pixel of the ranging sensor array for determining an address of the corresponding first pixel of the visible light sensor array.

7. The method according to claim 5, further comprising filtering background noise.

8. A computing system comprising:
    an image based interface, wherein the image based interface includes a visible light image sensor array of pixels and a ranging sensor array of pixels which visible light image sensor array and ranging sensor array are positioned in a parallel arrangement along a sensors axis and are substantially facing the same direction and having at least a partially overlapping field of view; and
    an image processing logic adapted to correlate a first pixel of the ranging sensor array, the first pixel capturing data from which is derived a ranging value representing a distance to an object, with a corresponding first pixel of the visible light sensor array, the corresponding first pixel capturing image data of the same object, based on the derived ranging value and the parallel arrangement of the arrays along the sensors axis.

9. The system according to claim 8, wherein said image processing logic is adapted to correlate the first pixel of the ranging sensor array, the first pixel capturing data from which is derived the ranging value representing the distance to the object with the corresponding first pixel of the visible light sensor array, the corresponding first pixel capturing image data of the same object, based on the derived ranging value and the parallel arrangement of the arrays along the sensors axis by estimating an offset value and applying the offset value to an address of the first pixel of the ranging sensor array for determining an address of the corresponding first pixel of the visible light sensor array.

10. The system according to claim 8, wherein said image processing logic is further adapted to filter background noise.

11. The computing system according to claim 8, wherein the computing system is selected from the group consisting of: a gaming console, a web-conferencing system and a security system.

12. A method of fabricating an imaging system comprising:
    aligning a visible light image sensor array of pixels and a ranging sensor array of pixels in a parallel arrangement along a sensors axis for substantially facing the same direction and having at least a partially overlapping field of view; and
    integrating image processing logic adapted to correlate the first pixel of the ranging sensor array, the first pixel capturing data from which is derived a ranging value representing a distance to an object, with a corresponding first pixel of the visible light sensor array, the corresponding first pixel capturing image data of the same object, based on the derived ranging value and the parallel arrangement of the arrays along the sensors axis.

13. The method according to claim 12, further comprising integrating an illumination module.

14. The method according to claim 12, further comprising integrating first and second modulators adapted to define a dynamic distance window.

15. The device according to claim 3, wherein estimating the offset value is further based on a pixel size difference between the first pixel of the ranging sensor array and the corresponding first pixel of the visible light sensor array.

* * * * *